United States Patent [19]

Johnson

[11] 4,381,331
[45] Apr. 26, 1983

[54] NON-STICKING PLY END TURN-OVER BLADDER AND METHOD OF MANUFACTURE THEREOF

[75] Inventor: James L. Johnson, Indiana, Pa.

[73] Assignee: McCreary Tire & Rubber Company, Indiana, Pa.

[21] Appl. No.: 338,229

[22] Filed: Jan. 11, 1982

Related U.S. Application Data

[63] Continuation of Ser. No. 157,950, Jun. 9, 1980, abandoned.

[51] Int. Cl.³ .............................................. D03D 3/00
[52] U.S. Cl. .................................... 428/224; 156/154; 156/166; 156/212; 264/139; 264/162; 428/229; 428/231; 428/232; 428/245; 428/294; 428/295; 428/492
[58] Field of Search .............. 428/224, 232, 245, 290, 428/295, 294, 257, 231, 492, 229; 264/137, 139, 162; 156/153, 154, 166, 212, 437, 416

[56] References Cited

U.S. PATENT DOCUMENTS 3,775,528 11/1973 Beneze ................................ 264/315
3,966,536 6/1976 Schmitt ............................... 156/401

FOREIGN PATENT DOCUMENTS 253193 9/1923 Canada .
910177 9/1972 Canada .

Primary Examiner—James J. Bell
Attorney, Agent, or Firm—Buell, Blenko, Ziesenheim & Beck

[57] ABSTRACT

The bladder has at least a portion of its outer surface comprising a fabric layer of cords partially embedded therein so that such cords project slightly above the rubber surface. The article is manufactured by calendering a fabric layer of cords on one side only with a coating of uncured and unvulcanized rubber, applying the layer to the bladder material with the rubber coated surface in contact therewith, and heating the article so formed to cure the rubber coating. The curing causes some of the rubber coating to flow between and over the outside surfaces of the cords. This excess rubber is removed by abrading the article so as to expose the cords. The abrading removes some of the cured rubber between the cords so that the cords project slightly above the surface of the rubber substrate.

6 Claims, 4 Drawing Figures

NON-STICKING PLY END TURN-OVER BLADDER AND METHOD OF MANUFACTURE THEREOF

This is a continuation of application Ser. No. 157,950, filed June 9, 1980 now abandoned.

This invention relates primarily to apparatus for manufacturing pneumatic vehicle tires. It is more particularly concerned with the inflatable rubber bladders conventionally used to turn ply ends over a bead ring and against plies on the tire building machine mandrel, although it is not limited to such bladders.

BACKGROUND OF THE INVENTION

Tire building machines as above mentioned conventionally use rolling inflatable rubber bladders to turn the ends of plies wrapped on the tire building mandrel up around the bead rings and over them against the ply material. The rubber ply material is tacky by nature and it is this tack which causes the plies to stick together. The turn-over bladders are conventionally made from vulcanized rubber, natural, synthetic or mixtures of the two, and the tacky ply ends have a tendency to stick to the bladders which turn them over, particularly, since the inflated bladders exert pressure on the turned over ply ends. This adhesion tends to retard the retraction of the deflated bladders, and it also results in erosion of the bladder material coming in contact with the ply ends.

The description of my invention which follows is specific to ply turn-over bladders but it will be evident that my invention is applicable to other articles which may come in contact with tacky rubber-like material.

APPLICANT'S INVENTION

It is an object of my invention to provide a ply turn-over bladder or the like which has less tendency to adhere to unvulcanized rubber or rubbery polymers than do conventional bladders made of the same materials. It is another object to provide such a bladder which is inherently or permanently less adhesive. It is another object to provide a process for manufacturing such bladders. Other objects of my invention will appear in the course of the description thereof which follows The above-mentioned objects and others are achieved by my bladder, at least a portion of the outer surface of which comprises a fabric layer of cords partially embedded therein so that such cords project slightly above the rubber surface. My article is manufactured by calendering a fabric layer of cords on one side only with a coating of uncured and unvulcanized rubber, applying the layer to the bladder material with the rubber coated surface in contact therewith, and heating the article so formed to cure the rubber coating. The curing causes some of the rubber coating to flow between and over the outside surfaces of the cords. This excess rubber is removed by abrading the article so as to expose the cords. The abrading removes some of the cured rubber between the cords so that the cords project slightly above the surface of the rubber substrate.

BRIEF DESCRIPTION OF THE DRAWINGS

In FIG. 1, bladder 11 is mounted on a tire building machine with one edge of its mouth clamped between mounting rings 17 and 18 and the other edge clamped between mounting rings 18 and 19. Ply end 20 is shown turned up around bead ring 21 and over against the ply body 22 wound on mandrel 23. On the outer surface of bladder 11, which would be against ply 20 in the turn-over operation, is positioned a fabric layer 16 comprising cords 12 parallel to the plane of the figure and fibers 13 normal to the plane of the figure.

Figure 1:
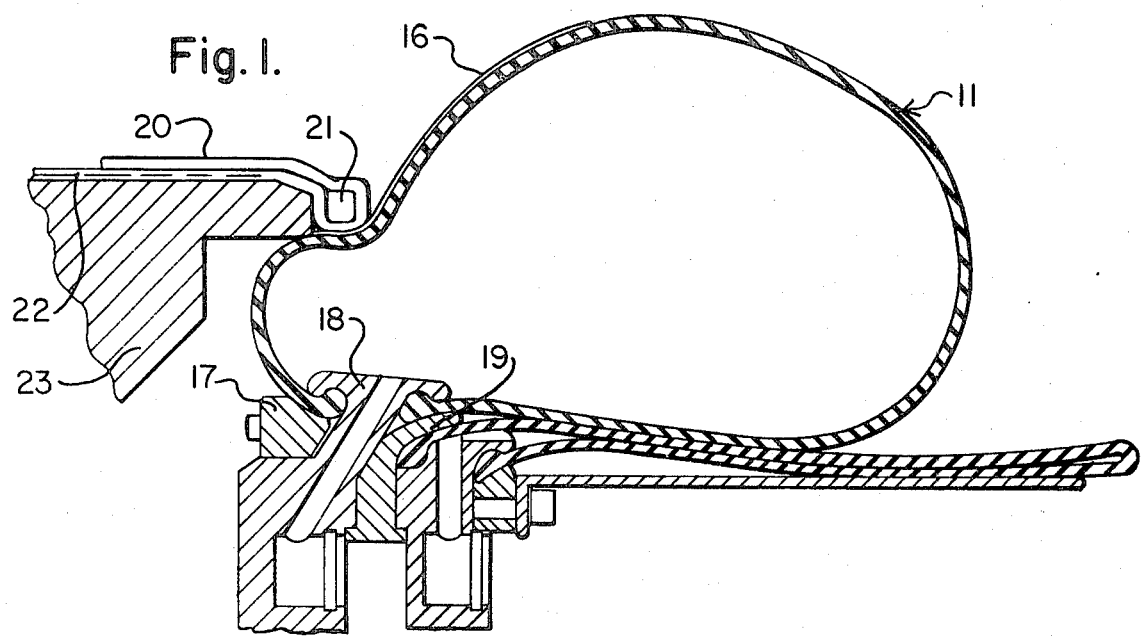
FIG. 1 is a cross section of a partially deflated and partially retracted turn-over bladder of my invention, showing the positioning of my fabric layer of cords thereon.
Figure 2:
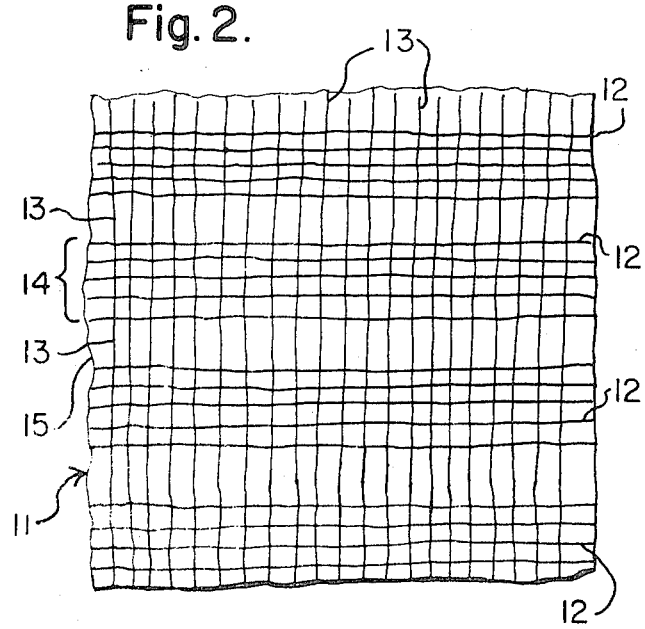
FIG. 2 is a partial plan of the portion of the bladder of FIG. 1 having my fabric layer of cords thereon.
Figure 3:
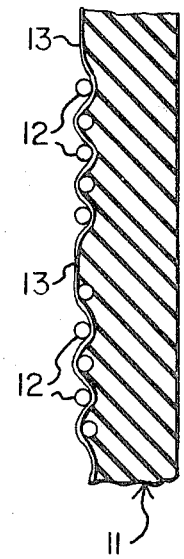
FIG. 3 is a side elevation of the portion of the bladder of FIG. 2 greatly enlarged.
Figure 4:
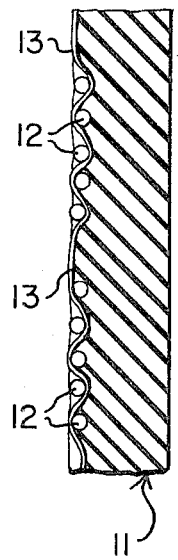
FIG. 4 is similar to FIG. 3 but shows the bladder before the fabric layer is abraded to expose the outer surface of the cords.

The completed bladder structure is illustrated in FIGS. 2 and 3, and the article at an intermediate stage of its manufacture is illustrated in FIG. 4. The rubber bladder 11 is bonded over at least a portion of its outside surface to a textile fabric 16 comprising parallel cords 12 interwoven with fibers 13 positioned at right angles to the cords 12. Cords 12 are arranged in groups 14 spaced from each other by intervals 15 greater than the spacing between individual cords 12. The spacing between fibers 13 is uniform. As is shown in FIG. 3 the material of rubber bladder 11 does not extend above cords 12. The latter are partially embedded in rubber bladder 11 so as to be bonded thereto but their upper surfaces extend somewhat above the upper surface of bladder 11 so as to form a textile contact surface for that portion of the bladder.

The reenforcing cords 12 may be of the same size and spacing as reenforcing cords used in certain types of pneumatic vehicle tires. The cords are positioned around the outer surface of the bladder more or less normal to the annular bladder mouth and to the mounting rings which hold the bladder in place on a tire building machine. Thus, when the inflated bladder turns over the ply end, the relative movement between bladder and ply is parallel to the direction of the embedded cords 12. That cord surface has much less tendency to stick to unvulcanized and uncured rubber materials than has vulcanized rubber.

The cords may be fibers of material normally used for tire cords such as cotton or synthetic materials including, polyesters, rayon or nylon.

I have also used cords of stretchable or elastic material. Those cords may be positioned either normal to the bladder mouth and to the mounting rings as are inextensible cords, or parallel to the bladder mouth and rings. The cords of stretchable or elastic material allow the bladder to expand circumferentially.

I manufacture my article by calendering the textile fabric 16 comprising cords 12 and fibers 13 on one side with a coating of uncured and unvulcanized rubber. I then apply that fabric to a portion of the surface of bladder 11 with the coated side of the layer against the rubber surface. The article so formed is then heated to cure the unvulcanized rubber. That heating causes some of the rubber coating to flow between and over cords 12 and fibers 13, as is shown in FIG. 4. I remove this excess rubber by abrading the outer surface of the article as shown in FIG. 4, preferably by rubbing across cords 12 with sandpaper, until the upper portions of cords 12 are clear of rubber and project slightly above the rubber bladder 11.

I have found that it is not necessary to abrade the outer surface of articles made by the process of my invention with textile fabric having cords of stretchable or elastic material.

In the following claims, I use the term "rubbery polymer" to comprehend natural and synthetic rubbers and mixtures thereof, together with other polymers of rubber-like consistency.

I claim:

1. A ply turn-over bladder formed of a rubbery polymer at least a portion of its outer surface having reduced adhesion to unvulcanized rubbery polymers, said portion comprising a fabric layer of spaced cords calendered with a coating of unvulcanized uncured rubbery polymer partially embedded in the rubbery polymer surface, the spaces between the cords being free of said polymer at said surface so that such cords project above said surface.

2. The ply turn-over bladder of claim 1 in which the cords are of stretchable material.

3. The ply turn-over bladder of claim 1 in which the cords are positioned to permit circumferential expansion of the bladder.

4. The ply turn-over bladder of claim 3 in which the cords are of inextensible material and are positioned on the outer surface of the bladder so that relative movement between bladder and ply is parallel to the direction of the cords.

5. The method of manufacturing a rubbery polymer article with at least a portion of its surface having reduced adhesion to unvulcanized rubbery polymers comprising calendering a fabric layer of inextensible cords on one side only with a coating of unvulcanized uncured polymer, applying that layer to the surface of the article with the coating against that surface, heating the article so formed to cure the coating, whereby some of the rubbery polymer coating flows between and over the cords, and abrading the outer surface of that layer so as to remove excess rubbery polymer coating and expose the outer surface of the cords.

6. The method of manufacturing a rubbery polymer article with at least a portion of its surface having reduced adhesion to unvulcanized rubbery polymers comprising calendering a fabric layer of stretchable cords on one side only with a coating of unvulcanized uncured polymer, applying that layer to the surface of the article with the coating against that surface, and heating the article so formed to cure the coating, whereby some of the rubbery polymer coating flows between the cords.

* * * * *

UNITED STATES PATENT AND TRADEMARK OFFICE
CERTIFICATE OF CORRECTION

PATENT NO. : 4,381,331
DATED : April 26, 1983
INVENTOR(S) : James L. Johnson

It is certified that error appears in the above-identified patent and that said Letters Patent are hereby corrected as shown below:

Column 3, line 5, the quotation marks should be beginning quotation marks, not end quotation marks.

Claim 5, column 4, line 14, "surface" should be --surfaces--.

Signed and Sealed this

Twenty-eighth Day of June 1983

[SEAL]

Attest:

GERALD J. MOSSINGHOFF

Attesting Officer　　Commissioner of Patents and Trademarks

REEXAMINATION CERTIFICATE (829th)
United States Patent [19]
Johnson

[11] B1 4,381,331

[45] Certificate Issued Mar. 29, 1988

[54] NON-STICKING PLY END TURN-OVER BLADDER AND METHOD OF MANUFACTURE THEREOF

[75] Inventor: James L. Johnson, Indiana, Pa.

[73] Assignee: McCreary Tire & Rubber Company, Indiana, Pa.

Reexamination Request:
No. 90/001,038, Jun. 23, 1986

Reexamination Certificate for:
Patent No.: 4,381,331
Issued: Apr. 26, 1983
Appl. No.: 338,229
Filed: Jan. 11, 1982

Certificate of Correction issued Jun. 28, 1983.

Related U.S. Application Data

[63] Continuation of Ser. No. 157,950, Jun. 9, 1980, abandoned.

[51] Int. Cl.⁴ .............................................. D03D 3/00
[52] U.S. Cl. ........................... 428/224; 156/154; 156/166; 156/212; 264/139; 264/162; 428/229; 428/231; 428/232; 428/245; 428/294; 428/295; 428/492
[58] Field of Search .............. 428/224, 229, 231, 232, 428/245, 294, 295, 492; 156/154, 166, 212; 264/134, 162

[56] References Cited
U.S. PATENT DOCUMENTS

| | | | |
|---|---|---|---|
| 1,746,948 | 2/1930 | King . | |
| 1,781,370 | 11/1930 | Debor . | |
| 2,207,279 | 7/1940 | Alderfer | 154/2 |
| 2,288,391 | 6/1942 | Carman | 154/2 |
| 2,297,204 | 9/1942 | Deissner | 18/47.5 |
| 2,927,051 | 3/1960 | Buckwalter et al. | 154/139 |
| 3,018,814 | 1/1962 | Saint-Paul | 152/361 |
| 3,053,308 | 9/1962 | Vanzo et al. | 156/416 |
| 3,095,917 | 7/1963 | Arsandaux | 152/155 |
| 3,097,985 | 7/1963 | Heuze | 156/416 |
| 3,101,289 | 8/1963 | Giletta et al. | 156/133 |
| 3,101,290 | 8/1963 | Paul | 156/137 |
| 3,106,879 | 10/1963 | Hamel | 94/18 |
| 3,111,444 | 11/1963 | Pouilloux | 156/416 |
| 3,111,445 | 11/1963 | Pouilloux et al. | 156/416 |
| 3,111,976 | 11/1963 | Delobelle | 152/362 |
| 3,118,710 | 1/1964 | Hamel | 308/37 |
| 3,137,513 | 6/1964 | Marot | 280/112 |
| 3,144,374 | 8/1964 | Saint-Paul | 156/416 |
| 3,160,516 | 12/1964 | Beaufils et al. | 117/76 |
| 3,171,769 | 3/1965 | Henley et al. | 156/132 |
| 3,271,229 | 9/1966 | Grabovez | 161/164 |
| 3,272,677 | 9/1966 | Black | 156/401 |
| 3,304,215 | 2/1967 | Paul | 156/137 |
| 3,308,074 | 3/1967 | Landler | 260/2.5 |
| 3,326,823 | 6/1967 | Landler | 260/2.5 |
| 3,335,843 | 8/1967 | Duvivier et al. | 198/193 |
| 3,342,239 | 9/1967 | Olagnier | 152/361 |
| 3,342,339 | 9/1967 | Riolo | 210/223 |
| 3,342,663 | 9/1967 | Pouilloux | 156/416 |
| 3,380,872 | 4/1968 | Pouilloux | 156/416 |
| 3,413,244 | 11/1968 | Landler | 260/2.5 |
| 3,436,288 | 4/1969 | Patterson | 156/142 |
| 3,441,074 | 4/1969 | Pouilloux et al. | 152/361 |
| 3,457,729 | 7/1969 | Wannerboy | 61/48 |
| 3,463,040 | 8/1969 | Pouilloux | 83/374 |
| 3,475,254 | 10/1969 | Henley | 156/401 |
| 3,503,291 | 3/1970 | Pouilloux et al. | 83/42 |
| 3,509,929 | 5/1970 | Delobelle | 152/354 |
| 3,511,331 | 5/1970 | Landry | 180/127 |
| 3,512,568 | 5/1970 | Delobelle | 152/361 |
| 3,539,170 | 11/1970 | Hamel | 267/63 |
| 3,543,828 | 12/1970 | Caille et al. | 152/361 |
| 3,607,497 | 9/1971 | Chrobak | 156/95 |
| 3,775,528 | 11/1973 | Beneze | 264/162 |
| 3,932,255 | 1/1976 | Saracsan | 156/401 |
| 3,966,536 | 6/1976 | Schmitt | 156/401 |
| 4,302,274 | 11/1981 | Enders | 156/401 |

FOREIGN PATENT DOCUMENTS

591562 4/1925 France .
1517849 2/1968 France .

OTHER PUBLICATIONS

Zelant-Gazu.

*Primary Examiner*—James J. Bell

[57] ABSTRACT

The bladder has at least a portion of its outer surface comprising a fabric layer of cords partially embedded therein so that such cords project slightly above the rubber surface. The article is manufactured by calendering a fabric layer of cords on one side only with a coating of uncured and unvulcanized rubber, applying the layer to the bladder material with the rubber coated surface in contact therewith, and heating the article so formed to cure the rubber coating. The curing causes some of the rubber coating to flow between and over the outside surfaces of the cords. This excess rubber is removed by abrading the article so as to expose the cords. The abrading removes some of the cured rubber between the cords so that the cords project slightly above the surface of the rubber substrate.

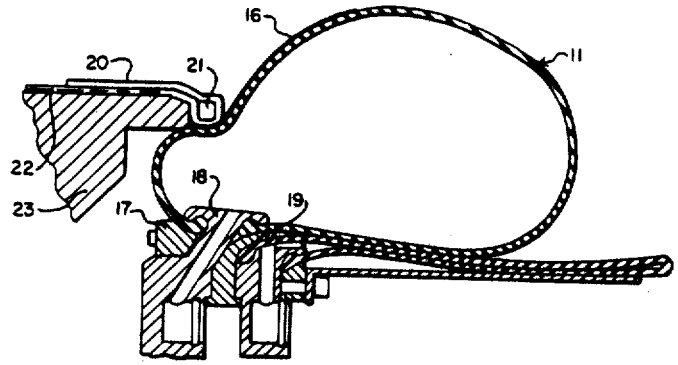

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *

REEXAMINATION CERTIFICATE (851st)
United States Patent [19]
Johnson

[11] B2 4,381,331
[45] Certificate Issued May 3, 1988

[54] NON-STICKING PLY END TURN-OVER BLADDER AND METHOD OF MANUFACTURE THEREOF

[75] Inventor: James L. Johnson, Indiana, Pa.

[73] Assignee: McCreary Tire & Rubber Company, Indiana, Pa.

Reexamination Request:
No. 90/001,069, Aug. 15, 1986

Reexamination Certificate for:
Patent No.: 4,381,331
Issued: Apr. 26, 1983
Appl. No.: 338,229
Filed: Jan. 11, 1982

Related U.S. Application Data

[63] Continuation of Ser. No. 157,950, Jun. 9, 1980, abandoned.

[51] Int. Cl.⁴ .................................................. D03D 3/00
[52] U.S. Cl. .................... 428/224; 156/154; 156/166; 156/212; 264/139; 264/162; 428/229; 428/231; 428/232; 428/245; 428/294; 428/295; 428/492
[58] Field of Search ............... 156/154, 166, 212, 153, 156/437, 416; 264/139, 162, 137; 428/224, 231, 232, 229, 245, 290, 294, 295, 257, 492

[56] References Cited
U.S. PATENT DOCUMENTS

| | | | |
|---|---|---|---|
| 1,746,948 | 2/1930 | King | 156/395 |
| 2,288,391 | 6/1942 | Carman | 156/165 |
| 2,297,204 | 9/1942 | Deissner | 18/47.5 |
| 2,927,051 | 3/1960 | Buckwalter et al. | 156/310 |
| 3,053,308 | 9/1962 | Vanzo et al. | 156/416 |
| 3,101,289 | 8/1963 | Giletta et al. | 156/416 |
| 3,272,677 | 9/1966 | Black | 156/403 |
| 3,475,254 | 10/1969 | Henley | 156/416 |
| 3,607,497 | 9/1971 | Chrobak | 156/397 |
| 3,775,528 | 11/1973 | Beneze | 156/125 |
| 3,966,536 | 6/1976 | Schmitt | 156/401 |

*Primary Examiner*—James J. Bell

[57] ABSTRACT

The bladder has at least a portion of its outer surface comprising a fabric layer of cords partially embedded therein so that such cords project slightly above the rubber surface. The article is manufactured by calendering a fabric layer of cords on one side only with a coating of uncured and unvulcanized rubber, applying the layer to the bladder material with the rubber coated surface in contact therewith, and heating the article so formed to cure the rubber coating. The curing causes some of the rubber coating to flow between and over the outside surfaces of the cords. This excess rubber is removed by abrading the article so as to expose the cords. The abrading removes some of the cured rubber between the cords so that the cords project slightly above the surface of the rubber substrate.

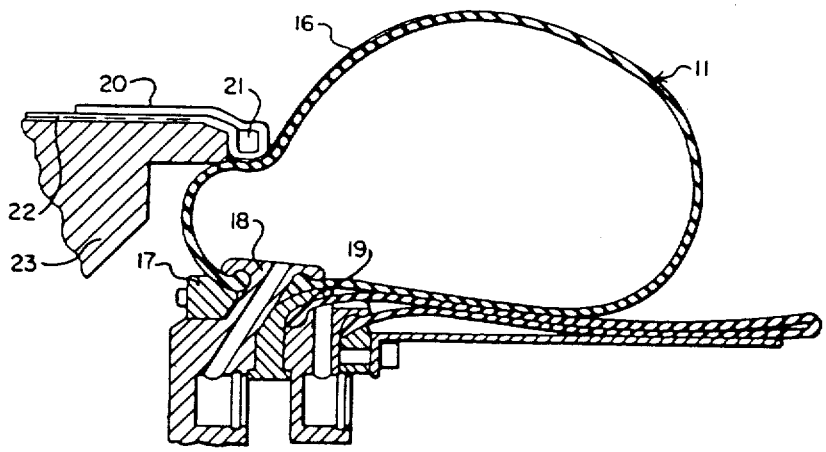

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *